(12) United States Patent
Jun

(10) Patent No.: US 7,446,841 B2
(45) Date of Patent: Nov. 4, 2008

(54) LIQUID CRYSTAL DISPLAY APPARATUS

(75) Inventor: Sahng-Ik Jun, Seoul (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 217 days.

(21) Appl. No.: 10/640,679

(22) Filed: Aug. 14, 2003

(65) Prior Publication Data

US 2004/0201811 A1   Oct. 14, 2004

(30) Foreign Application Priority Data

Apr. 10, 2003   (KR) .................. 10-2003-0022742

(51) Int. Cl.
*G02F 1/1343* (2006.01)

(52) U.S. Cl. .................. 349/146; 349/143; 349/147

(58) Field of Classification Search .................. 349/139, 349/145–147, 143
See application file for complete search history.

(56) References Cited

U.S. PATENT DOCUMENTS

| | | | | |
|---|---|---|---|---|
| 5,146,356 A | * | 9/1992 | Carlson | .................. 349/38 |
| 5,737,051 A | * | 4/1998 | Kondo et al. | .................. 349/149 |
| 6,288,763 B1 | * | 9/2001 | Hirota | .................. 349/141 |
| 6,710,836 B2 | * | 3/2004 | Lee | .................. 349/141 |
| 6,987,551 B2 | * | 1/2006 | Suzuki et al. | .................. 349/141 |
| 2004/0201811 A1 | * | 10/2004 | Jun | .................. 349/146 |
| 2006/0232537 A1 | * | 10/2006 | Kim et al. | .................. 345/92 |

* cited by examiner

*Primary Examiner*—Dung T. Nguyen
(74) *Attorney, Agent, or Firm*—MacPherson Kwok Chen & Heid LLP; Mark A. Pellegrini

(57) ABSTRACT

In an LCD apparatus, a pixel area defined by data lines and gate lines intersected with each other has a V-shape. A first electrode having the V-shape is formed in the pixel area disposed adjacent to a data line corresponding to a present stage among the data lines so as to partially cover the pixel area and a second electrode having the V-shape is formed in the pixel area adjacent to a data line corresponding to a previous stage among the data lines so as to cover the pixel area partially. A pixel electrode is partially overlapped with the first and second electrodes or spaced apart from the first and second electrodes in a predetermined interval. Accordingly, a width of a light-shielding layer for covering the first and second electrodes and an interval between the data line and the first and second electrodes may be reduced, thereby enhancing a transmittance and a response time.

22 Claims, 16 Drawing Sheets

US 7,446,841 B2

LIQUID CRYSTAL DISPLAY APPARATUS

CROSS-REFERENCE TO RELATED APPLICATION

This application relies for priority upon Korean Patent Application No. 2003-22742 filed on Apr. 10, 2003, the contents of which are herein incorporated by reference in its entirety.

BACKGROUND OF THE INVENTION

1. Field of the Invention

The present invention relates to an LCD (Liquid Crystal Display) apparatus, and more particularly to an LCD apparatus having an enhanced response speed and light transmittance.

2. Description of the Related Art

An LCD apparatus, generally, includes a TFT (Thin Film Transistor) substrate on which a TFT for switching a pixel is formed, a color filter substrate on which a common electrode is formed and liquid crystal interposed between the TFT substrate and color filter substrate. The LCD apparatus applies a voltage to a pixel electrode and the common electrode formed at the TFT substrate and color filter substrate, respectively, so as to drive the liquid crystal and to control a light transmittance of the liquid crystal, thereby displaying an image.

In recent, an LCD apparatus is widely used, and thus consumer's demand for improvements is strong, for example, visual properties, display qualities, etc., of the LCD apparatus. In order to meet consumer's demand, an LCD apparatus having a vertically aligned mode (hereinafter, referred to as "VA mode") has been developed.

The VA mode LCD apparatus includes two substrates treated by a vertically aligned treatment and liquid crystal interposed between the two substrates and having a negative type dielectric constant anisotropy.

The liquid crystal assumes a homeotropic alignment, and thus the liquid crystal is aligned in a direction substantially perpendicular to surfaces of the two substrates when a voltage is not applied to the two substrates, thereby maintaining the liquid crystal in a black mode state. On the contrary, the liquid crystal is aligned in a direction substantially parallel to the surfaces of the two substrates when the voltage is applied to the two substrates, thereby displaying the maintenance of the liquid crystal in a white mode state. When a voltage, which is smaller than the voltage applied to the two substrates, is applied to the two substrates while the liquid crystal is aligned in the direction substantially parallel to the surfaces of the two substrates, the liquid crystal is aligned in a direction inclined with respect to the surfaces of the two substrates.

FIG. 1 is a schematic plane view showing a conventional PVA mode LCD apparatus. FIG. 2 is a cross-sectional view taken along the line B-B' for showing the conventional PVA mode LCD apparatus shown in FIG. 1.

Referring to FIGS. 1 and 2, a conventional PVA mode LCD apparatus includes a first substrate 100 on which a TFT 110 is formed, a second substrate 200 on which a light-shielding layer 210 is formed, and liquid crystal (not shown) interposed between the first and second substrates 100 and 200. A polarizing film (not shown) is disposed under the first substrate 100 and on the second substrate 200 so as to selectively transmit a light provided from a backlight assembly (not shown) according to a polarizing axis thereof.

The first substrate 100 includes a plurality of gate lines 120 substantially parallel to each other, a plurality of data lines 130 substantially parallel to each other and substantially perpendicular to the gate lines 120, a pixel area defined by the gate and data lines 120 and 130 and a pixel electrode 140 formed on the pixel area. The second substrate 200 includes a common electrode 220 formed on the light-shielding layer 210.

An LCD apparatus, generally, includes first, second and third electrodes 150, 160 and 170 so as to align the liquid crystal in a multi-domain structure or in a different direction from each other. The first electrode 150 is formed on the first substrate 100 and the second and third electrodes 160 and 170 are formed on the second substrate 200.

The first electrode 150 includes a first protruding portion 150a symmetrically formed to each other with respect to an imaginary line A-A' and inclined with respect to the data line 130 and a second protruding portion 150b substantially parallel to the data line 130 so as to connect ends of the first protruding portion 150a.

The second protruding portion 150b is completely covered by the light-shielding layer 210 formed on the second substrate 200. That is, the light-shielding layer 210 has a width of about 28 micrometers wider than a sum of a width of the second protruding portion 150b formed at both sides of the data line 130. The first electrode 150 is insulated from the pixel electrode 140 by means of a gate-insulating layer 102 and the second protruding portion 150b is spaced apart from the data line 130 by an interval of about 5.5 micrometers.

The second electrode 160 has a V-shape and the first and second electrode 150 and 160 are alternately arranged with one another. The third electrode 170 is inwardly disposed between the second electrode 160 and an adjacent second electrode and has a Y-shape. The second and third electrodes 160 and 170 are formed by partially removing the common electrode 220 formed on the second substrate 200.

FIG. 3A is a schematic plane view showing a tilting direction of liquid crystal at an area adjacent to a data line of a conventional LCD apparatus. FIG. 3B is a schematic plane view showing a polarizing axis and a tilting direction of liquid crystal at an area adjacent to a data line of a conventional LCD apparatus.

As shown in FIG. 3A, the pixel electrode 140 is overlapped with the second protruding portion 150b adjacent to the data line 130 so as to completely cover the second protruding portion 150b.

In general, the liquid crystal having the negative type dielectric constant anisotropy is tilted in an angle of about 45 degrees with respect to a polarizing axis. However, the liquid crystal adjacent to an end of the pixel electrode 140 is vertically aligned while an electric field is not applied thereto, so that the liquid crystal is maintained in the black mode state 300.

Referring to FIG. 3B, the liquid crystal adjacent to the end of the pixel electrode 140 is tilted in a same direction as the polarizing axis 310 at an initial stage to which the electric field is applied, and then the liquid crystal adjacent to the end of the pixel electrode 140 is tilted in the angle of about 45 degrees with respect to the polarizing axis 310 due to the liquid crystal not adjacent to the end of the pixel electrode 140.

That is, since the liquid crystal adjacent to the end of the pixel electrode 140 is tilted in the same direction as the polarizing axis 310 even if the electric field is applied to the liquid crystal, brightness of the LCD apparatus may be deteriorated.

Also, in order to tilt the liquid crystal adjacent to the end of the pixel electrode 140 in the angle of about 45 degrees with respect to the polarizing axis 310, two step-motion, for example, such as arranging in the same direction as the polarizing axis 310 and tilting in the angle of about 45 degrees with respect to the polarizing axis 310, has to be performed. Thus, tilting processes of the liquid crystal adjacent to the end of the pixel electrode 140 may become complex.

BRIEF SUMMARY OF THE INVENTION

The present invention provides an LCD apparatus having an enhanced response speed and light transmittance.

In one aspect of the invention, an LCD apparatus includes a first substrate, a second substrate facing the first substrate, liquid crystal interposed between the first and second substrates, a light emitting unit disposed under the second substrate and supplying a light to the first and second substrates, and a polarizing film having a polarizing axis for selectively transmitting the light, which is disposed on an upper surface of the first substrate and a lower surface of the second substrate, respectively.

The second substrate includes a plurality of gate lines extended in a first direction and arranged in a second direction substantially perpendicular to the first direction, a plurality of data lines intersected with the gate lines, a plurality of pixel areas having a V-shape defined by the gate and data lines, a first electrode having the V-shape, formed in the pixel areas and adjacent to a data line corresponding to a present pixel area among the pixel areas, on which the first electrode is formed, a second electrode having the V-shape, formed in the pixel areas and adjacent to a data line corresponding to a previous pixel area among the pixel areas, and a pixel electrode formed in the pixel areas.

In another aspect of the invention, an LCD apparatus includes a first substrate, a second substrate facing the first substrate, liquid crystal interposed between the first and second substrates, a light emitting unit disposed under the second substrate and supplying a light to the first and second substrates, and a polarizing film having a polarizing axis for selectively transmitting the light, which is disposed on an upper surface of the first substrate and a lower surface of the second substrate, respectively.

The second substrate includes a plurality of gate lines extended in a first direction and arranged in a second direction substantially perpendicular to the first direction, a plurality of data lines intersected with the gate lines, and a plurality of pixel areas having a V-shape defined by the gate and data lines, a first electrode having the V-shape, formed in the pixel areas and adjacent to a data line corresponding to a present pixel area among the pixel areas, on which the first electrode is formed, so as to partially cover the pixel areas, a second electrode having the V-shape, formed in the pixel areas and adjacent to a data line corresponding to a previous pixel area among the pixel areas so as to partially cover the pixel area, and a pixel electrode partially overlapped with the first and second electrodes.

According to the LCD apparatus of the present invention, in order to cover the first and second electrodes, the width of the light-shielding layer formed on the first substrate and the interval between the first and second electrodes may be reduced, thereby enhancing the transmittance and the response speed of the LCD apparatus.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 4:
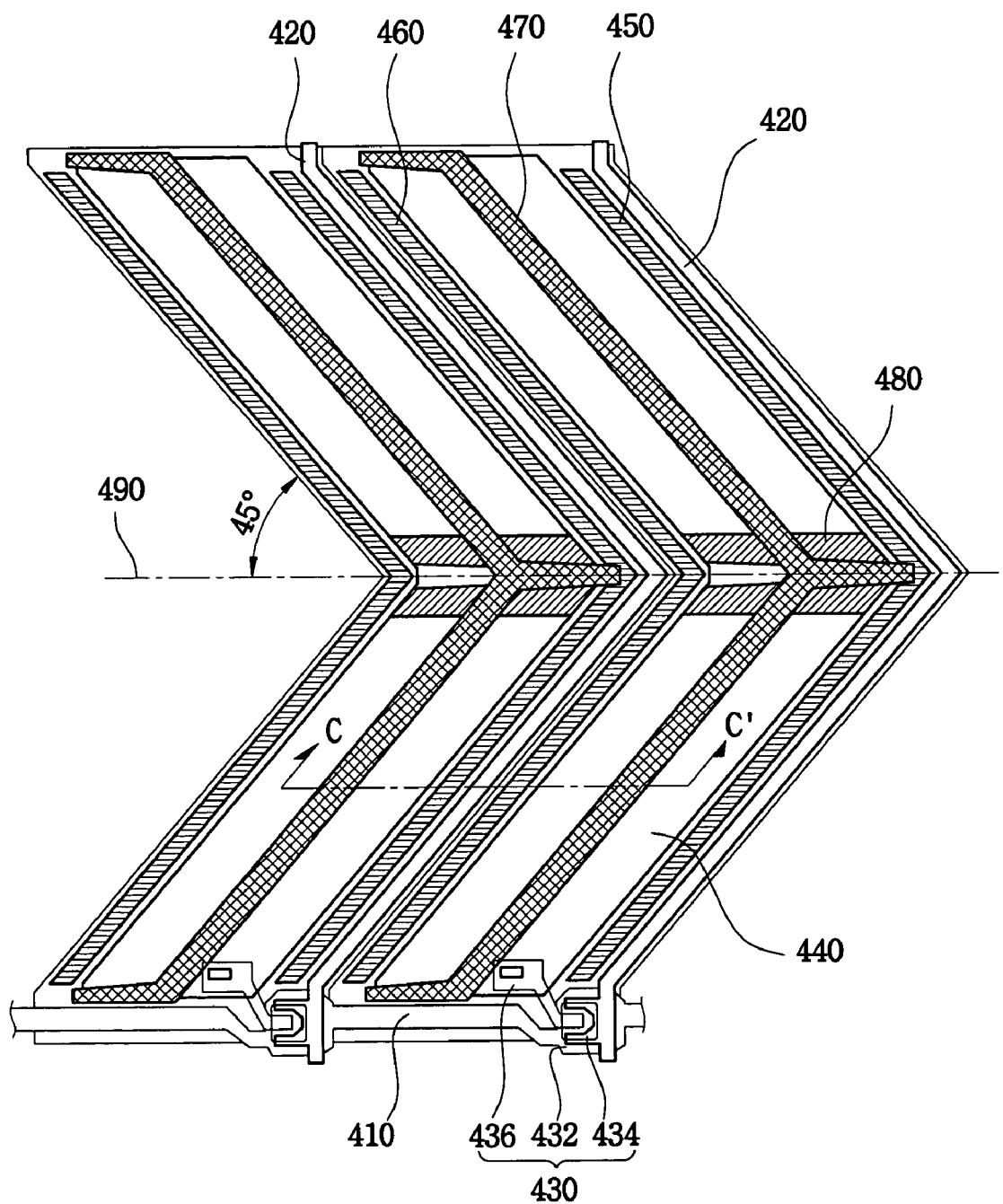
FIG. 4 is a plane view showing an LCD apparatus according to an exemplary embodiment of the present invention.
Figure 5:
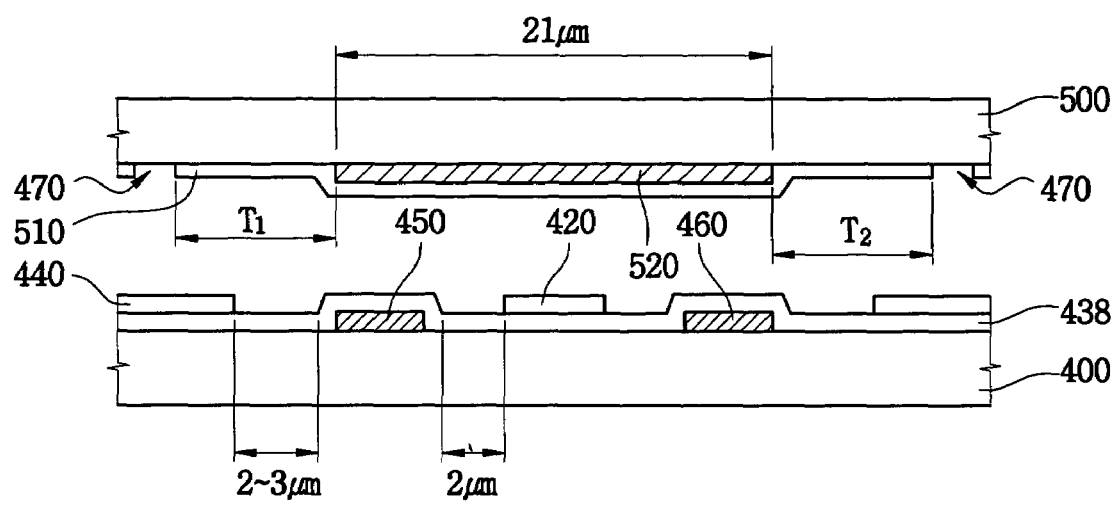
FIG. 5 is a cross-sectional view taken along the line C-C' for showing the LCD apparatus shown in FIG. 4.
Figure 6:
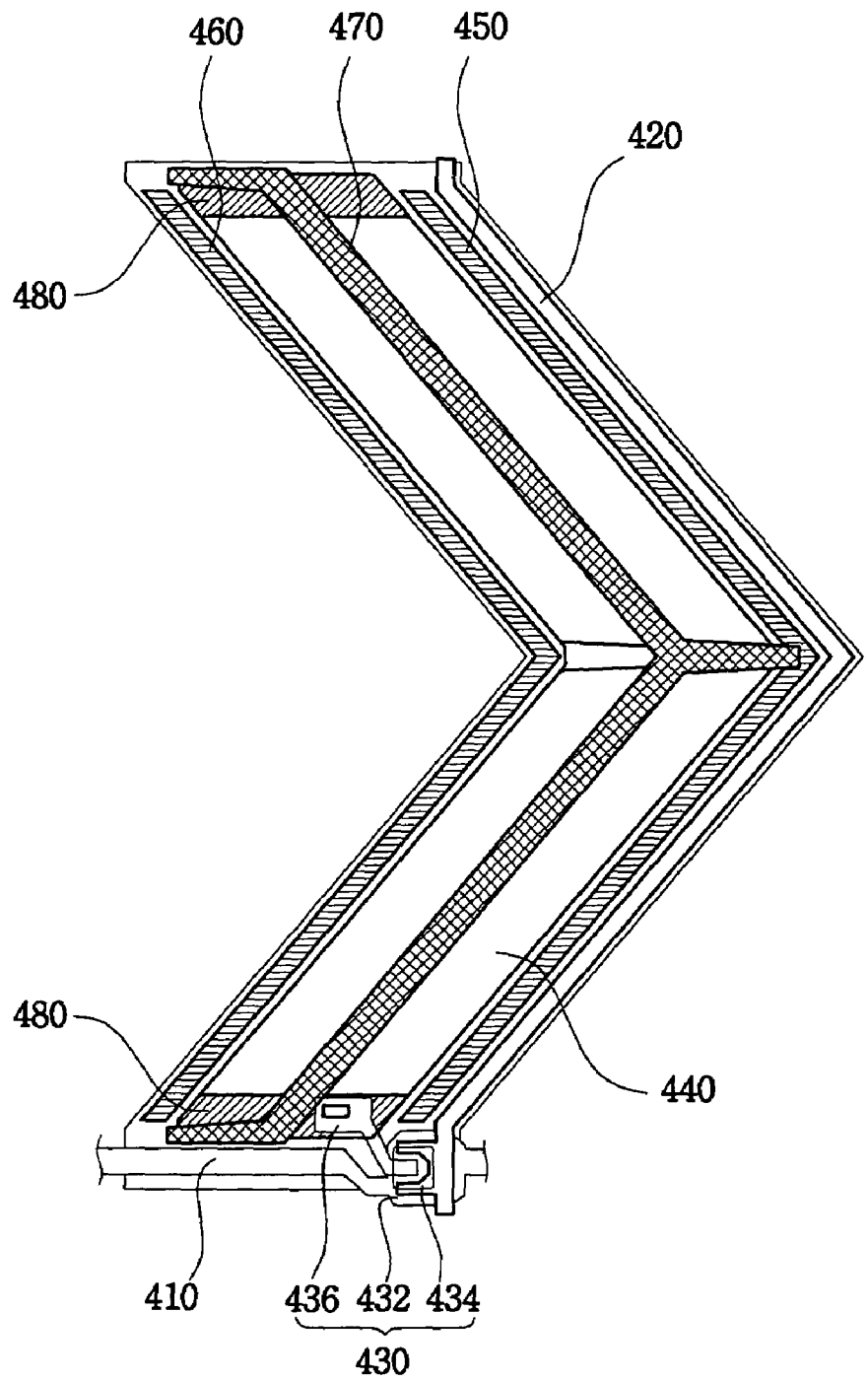
FIG. 6 is a plane view showing a metal pattern according to another exemplary embodiment of the LCD apparatus shown in FIG. 4.

FIG. 4 is a plane view showing an LCD apparatus according to an exemplary embodiment of the present invention. FIG. 5 is a cross-sectional view taken along the line C-C' for showing the LCD apparatus shown in FIG. 4. FIG. 6 is a plane view showing a metal pattern according to another exemplary embodiment of the LCD apparatus shown in FIG. 4.

Particularly, in FIG. 4, a pixel area of a PVA mode LCD apparatus having an electrode pattern that uniformly arranges liquid crystal will be described. When an electric field is applied to the liquid crystal, the liquid crystal is inclined in a different direction from each other with respect to a polarizing axis, thereby enhancing visual angle characteristics.

Referring to FIGS. 4 and 5, an LCD apparatus according to an exemplary embodiment of the present invention includes a first substrate 400, a second substrate 500 and liquid crystal (not shown) having a negative type dielectric constant anisotropy and interposed between the first and second substrates 400 and 500. The first and second substrates 400 and 500 include vertically aligned surfaces, and first, second and third electrodes 450, 460 and 470 so as to cover a pixel area partially and to arrange the liquid crystal stable in the pixel area.

The first substrate 400 includes a plurality of gate lines 410 extended in a first direction and arranged in a second direction substantially perpendicular to the first direction. The first substrate 400 includes a plurality of data lines 420 intersected with the gate lines 410. The first substrate 400 further includes a TFT 430 formed at an intersection of the gate and data lines 410 and 420 and a pixel electrode 440 formed in the pixel area defined by the gate and data lines 410 and 420.

As shown in FIG. 4, the pixel area is defined by two gate lines of the gate lines 410, which are adjacent to each other, and two data lines of the data lines 420, which are adjacent to each other, thereby having a V-shape bent at a center portion.

Also, each of the data lines 420 has the V-shape corresponding to the pixel area.

The TFT 430 includes a gate electrode 432, a source electrode 434 and a drain electrode 436. The gate electrode 432 is insulated from the source and drain electrodes 434 and 436 by means of a gate-insulating layer 438.

The first electrode 450 is disposed adjacent to a data line corresponding to a present stage among the data lines 420 and has the V-shape corresponding to those of the data lines 420. The second electrode 460 is disposed adjacent to a data line corresponding to a previous stage among the data lines 420 and also has the V-shape corresponding to those of the data lines 420. The first and second electrodes 450 and 460 have the V-shape, and thus the first and second electrodes 450 and 460 are inclined in an angle of about 45 degrees with respect to a polarizing axis 490 of a polarizing plate (not shown).

The first electrode 450 comprises a same material, for example, such as a metal material, as the second electrode 460 and the first and second electrodes 450 and 460 are formed under the gate-insulating layer 438.

The third electrode 470 is formed by partially removing a common electrode 510 and disposed between the first and second electrodes 450 and 460. Particularly, the third electrode 470 includes a first opening portion extended from a bending portion of the first electrode 450 to the first direction with a predetermined length, a second opening portion extended from an end of the first opening portion to the second direction and a third direction substantially opposite to the second direction and inclined in a predetermined slope with respect to the first opening portion, and a third opening portion extended from an end of the second opening portion to the second electrode with a predetermined length, and thus the third electrode 470 has a Y-shape. The second opening portion is substantially parallel to the data lines 420.

The pixel electrode 440 has the V-shape corresponding to the first and second electrodes 450 and 460. The pixel electrode 440 is spaced apart from the first and second electrodes 450 and 460 in a predetermined interval.

Particularly, the pixel electrode 440 is formed on the gate-insulating layer 438 and spaced apart from the first and second electrodes 450 and 460 in the predetermined interval from about 2 to about 3 micrometers. In this exemplary embodiment, the first electrode 450 is spaced apart from the data line 420 adjacent thereto in a first interval of about 2 micrometers and the second electrode 460 is spaced apart from the data line 420 adjacent thereto in a second interval of about 2 micrometers. Thus, an interval T1 between the first electrode 450 and third electrode 470 and an interval T2 between the second electrode 460 and third electrode 470 may be reduced.

The second substrate 500 includes a light-shielding layer 520 disposed between the second substrate 500 and common electrode 510 so as to cover the first and second electrodes 450 and 460. The light-shielding layer 520 has a width equal to a sum of a width of the first electrode 450, a width of the second electrode 460 and the first and second intervals. Particularly, the light-shielding layer 520 has a width of about 21 micrometers.

Thus, the width of the light-shielding layer 520 may be reduced because the first interval between the first electrode 450 and data line 420 and the second interval between the second electrode 460 and data line 420 are reduced. Also, although an area from about 2 to about 3 micrometers adjacent to the pixel electrode 440 is not covered by means of the light-shielding layer 520, texture and two step-motion may be prevented since the light-shielding layer 520 has the width suitable for covering the first and second electrodes 450 and 460.

In this exemplary embodiment, the pixel electrode 440 is not overlapped with the first and second electrodes 450 and 460. Accordingly, a metal pattern 480 is separately formed at an upper portion of the pixel electrode 440, which is adjacent to a center portion of the pixel electrode 440. The metal pattern 480 acts as an upper electrode of a storage capacitor Cst and the pixel electrode 440 corresponding to the metal pattern 480 partially acts as a lower electrode of the storage capacitor Cst.

Referring to FIG. 6, the metal pattern 480 that acts as the upper electrode of the storage capacitor Cst maybe formed at an area adjacent to the gate line 410.

In case that the metal pattern 480 is formed at the center portion of the pixel area as shown in FIG. 4, the pixel area has an opening ratio of about 45% and in case that the metal pattern 480 is formed at the area adjacent to the gate line 410, the pixel area has an opening ratio of about 48%.

Figure 7A:
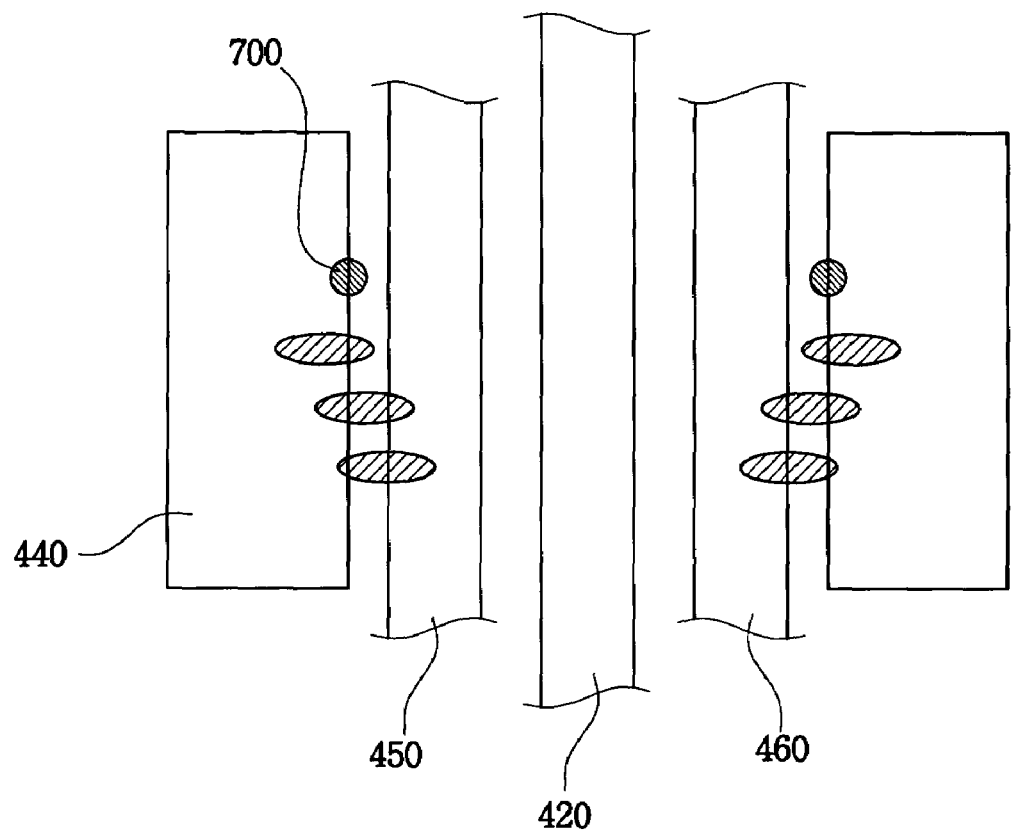
FIG. 7A is a plane view showing an arranged direction of liquid crystal disposed on an area adjacent to a data line in an LCD apparatus according to an exemplary embodiment of the present invention.
Figure 7B:
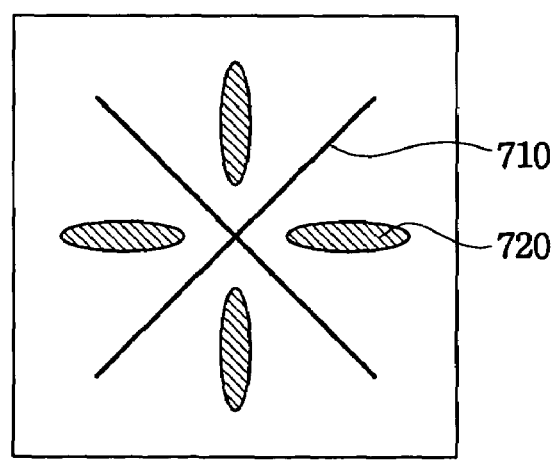
FIG. 7B is a plane view showing a polarizing axis and an arranged direction of liquid crystal disposed on an area adjacent to a data line in an LCD apparatus according to an exemplary embodiment of the present invention.

FIG. 7A is a plane view showing an arranged direction of liquid crystal disposed on an area adjacent to a data line in an LCD apparatus according to an exemplary embodiment of the present invention. FIG. 7B is a plane view showing a polarizing axis and an arranged direction of liquid crystal disposed on an area adjacent to a data line in an LCD apparatus according to an exemplary embodiment of the present invention.

As shown in FIGS. 7A and 7B, the pixel electrode 440 is spaced apart from the first and second electrodes 450 and 460, which are adjacent to the data line 420, in the predetermined interval.

The liquid crystal adjacent to an edge of the pixel electrode 440 maintains a black mode state 700 of which the liquid crystal is vertically aligned while the electric field is not applied thereto. When the electric field is applied to the liquid crystal, the liquid crystal 720 is tilted in an angle of about 45 degrees with respect to a polarizing axis 710.

Figure 8:
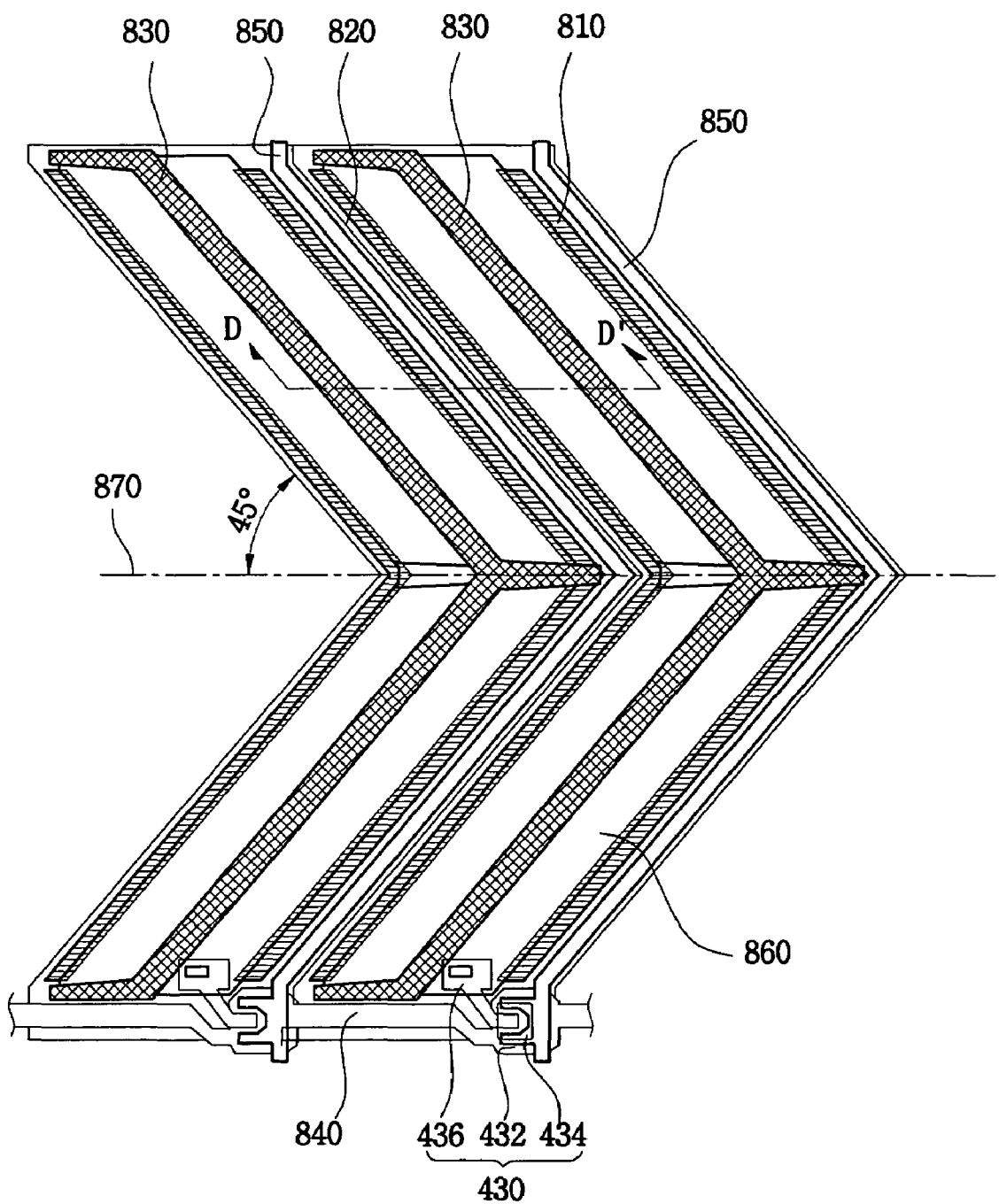
FIG. 8 is a plane view showing an LCD apparatus according to another exemplary embodiment of the present invention.
Figure 9:
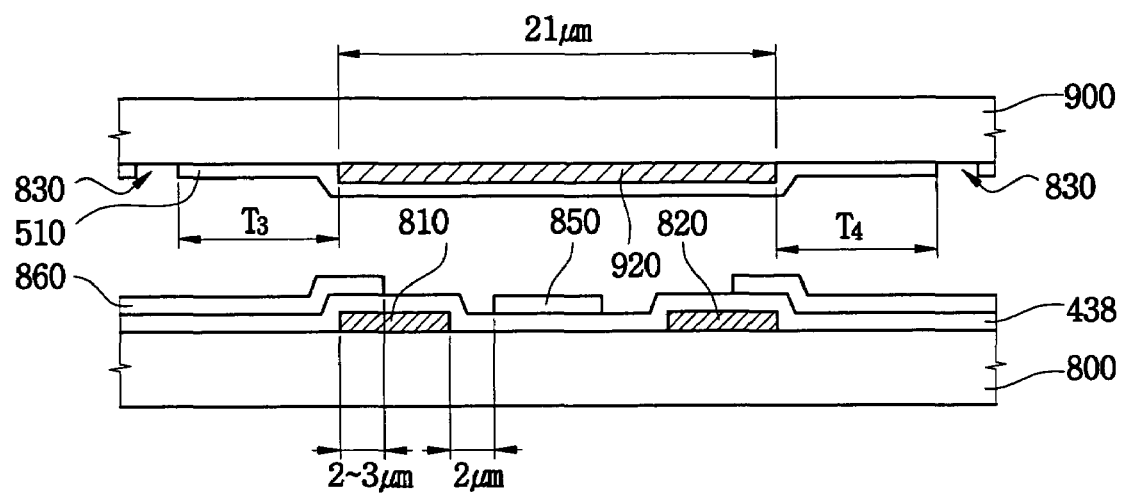
FIG. 9 is a cross-sectional view showing the LCD apparatus shown in FIG. 8.

FIG. 8 is a plane view showing an LCD apparatus according to another exemplary embodiment of the present invention. FIG. 9 is a cross-sectional view showing the LCD apparatus shown in FIG. 8.

Referring to FIGS. 8 and 9, an LCD apparatus according to another exemplary embodiment of the present invention includes a first substrate 800, a second substrate 900, liquid crystal (not shown) having a negative type dielectric constant anisotropy and interposed between the first and second substrates 800 and 900, and first, second and third electrodes 810, 820 and 830 so as to cover a pixel area partially and to arrange the liquid crystal stable in the pixel area.

The first substrate 800 includes a plurality of gate lines 840 extended in a first direction and arranged in a second direction substantially perpendicular to the first direction. The first substrate 800 also includes a plurality of data lines 850 intersected with the gate lines 840, a TFT 430 formed at an intersection of the gate and data lines 840 and 850 in a matrix configuration. The first substrate 800 further includes a pixel electrode 860 formed in the pixel area.

As shown in FIG. 8, the pixel area is defined by two gate lines of the gate lines 840, which are adjacent to each other, and two data lines of the data lines 850, which are adjacent to each other, thereby having a V-shape bent at a center portion. Also, each of the data lines 8500 has the V-shape corresponding to the pixel area.

In FIG. 8, the same reference numerals denote the same elements in FIG. 4, and thus the detailed descriptions of the same elements will be omitted.

The first electrode 810 is disposed adjacent to a data line corresponding to a present stage among the data lines 850 and has the V-shape corresponding to those of the data lines 850. The second electrode 820 is disposed adjacent to a data line corresponding to a previous stage among the data lines 850 and also has the V-shape corresponding to those of the data lines 850. The first and second electrodes 810 and 820 have the V-shape, and thus the first and second electrodes 810 and 820 are inclined in an angle of about 45 degrees with respect to a polarizing axis of a polarizing plate (not shown).

The first electrode 810 comprises a same material, for example, such as a metal material, as the second electrode 820 and the first and second electrodes 810 and 820 are formed under the gate-insulating layer 438.

The third electrode 830 is formed by partially removing a common electrode 510 and disposed between the first and second electrodes 810 and 820. Particularly, the third electrode 830 includes a first opening portion extended from a bending portion of the first electrode 810 to the first direction with a predetermined length and substantially parallel to the gate line 840. The third electrode 830 also includes a second opening portion extended from an end of the first opening portion to the second direction and a third direction substantially opposite to the second direction and inclined in a predetermined slope with respect to the first opening portion. The third electrode 830 further includes a third opening portion extended from an end of the second opening portion to the second electrode with a predetermined length, and thus the third electrode 830 has a Y-shape. The second opening portion is substantially parallel to the data lines 850.

The pixel electrode 860 has the V-shape corresponding to the first and second electrodes 810 and 820. The pixel electrode 860 is formed on the gate-insulating layer 438 and partially overlapped with the first and second electrodes 810 and 820.

Particularly, the pixel electrode 860 is overlapped with the first and second electrodes 810 and 820 in terms of a width from about 2 to about 3 micrometers. In this exemplary embodiment, the first electrode 810 is spaced apart from the data line 850 adjacent thereto in a first interval of about 2 micrometers and the second electrode 820 is spaced apart from the data line 850 adjacent thereto in a second interval of about 2 micrometers.

Thus, the first and second electrodes 810 and 820 has the V-shape and are tilted in the angle of about 45 degrees with respect to the polarizing axis 870 of the polarizing film (not shown).

A storage capacitor is formed on an area at which the pixel electrode 860 is partially overlapped with the first and second electrodes 810 and 820. The pixel electrode 860 partially overlapped with the first and second electrodes 810 and 820 acts as an upper electrode of the storage capacitor, and the first and second electrodes 810 and 820 act as a lower electrode of the storage capacitor.

Thus, an interval T3 between the first electrode 810 and third electrode 830 and an interval T4 between the second electrode 830 and third electrode 830 may be reduced.

The second substrate 900 includes a light-shielding layer 920 disposed between the second substrate 900 and common electrode 510 so as to cover the first and second electrodes 810 and 820. The light-shielding layer 920 has a width equal to a sum of a width of the first electrode 810, a width of the second electrode 820 and the first and second intervals. Particularly, the light-shielding layer 920 has a width of about 21 micrometers.

Thus, the width of the light-shielding layer 920 may be reduced because the first interval between the first electrode 810 and data line 850 and the second interval between the second electrode 820 and data line 850 are reduced. Also, although an area from about 2 to about 3 micrometers adjacent to the pixel electrode 860 is not covered by means of the light-shielding layer 920, texture and two step-motion may be prevented since the light-shielding layer 920 has the width suitable for covering the first and second electrodes 810 and 820.

Figure 10A:
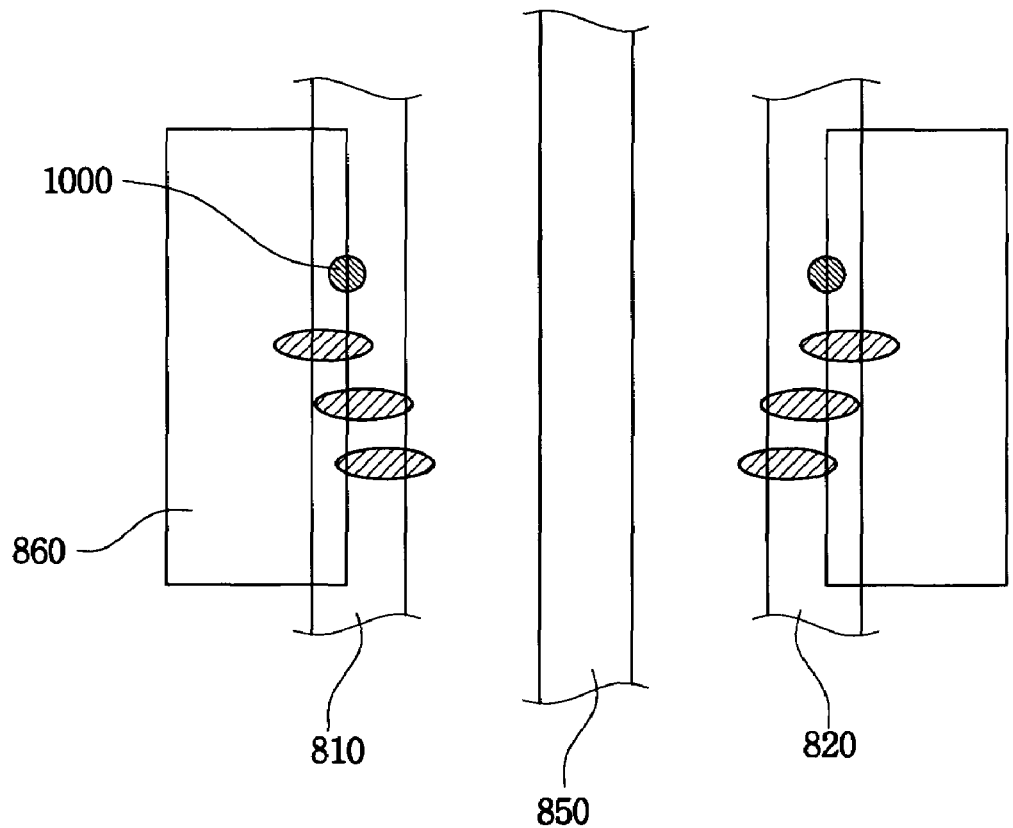
FIG. 10A is a plane view showing an arranged direction of liquid crystal disposed on an area adjacent to a data line in an LCD apparatus according to another exemplary embodiment of the present invention.
Figure 10B:
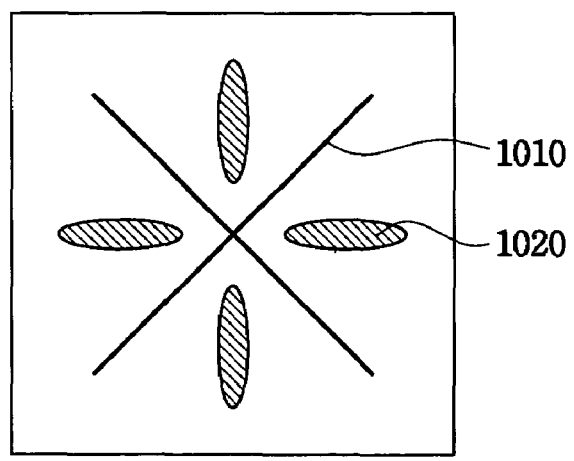
FIG. 10B is a plane view showing a polarizing axis and an arranged direction of liquid crystal disposed on an area adjacent to a data line in an LCD apparatus according to another exemplary embodiment of the present invention.

FIG. 10A is a plane view showing an arranged direction of liquid crystal disposed on an area adjacent to a data line in an LCD apparatus according to another exemplary embodiment of the present invention. FIG. 10B is a plane view showing a polarizing axis and an arranged direction of liquid crystal disposed on an area adjacent to a data line in an LCD apparatus according to another exemplary embodiment of the present invention.

As shown in FIGS. 10A and 10B, the pixel electrode 860 is partially overlapped with the first and second electrodes 810 and 820, which are adjacent to the data line 850.

The liquid crystal adjacent to an edge of the pixel electrode 860 maintains a black mode state 1000 of which the liquid crystal is vertically aligned while the electric field is not applied thereto. When the electric field is applied to the liquid crystal, the liquid crystal 1020 is tilted in an angle of about 45 degrees with respect to a polarizing axis 1020.

Hereinafter, operational characteristics of the LCD apparatus according to exemplary embodiments of the present invention will be described in detail with reference to accompanied drawings.

The LCD apparatus according to exemplary embodiments shown in FIGS. 4 to 9 may reduce display defect that appears on a display screen thereof.

The display defect that appears in a vertical direction increases in proportion to increase of a variation value of a coupling capacitance generated due to the data line overlapped with pixel electrodes adjacent to the data line.

Figure 1:
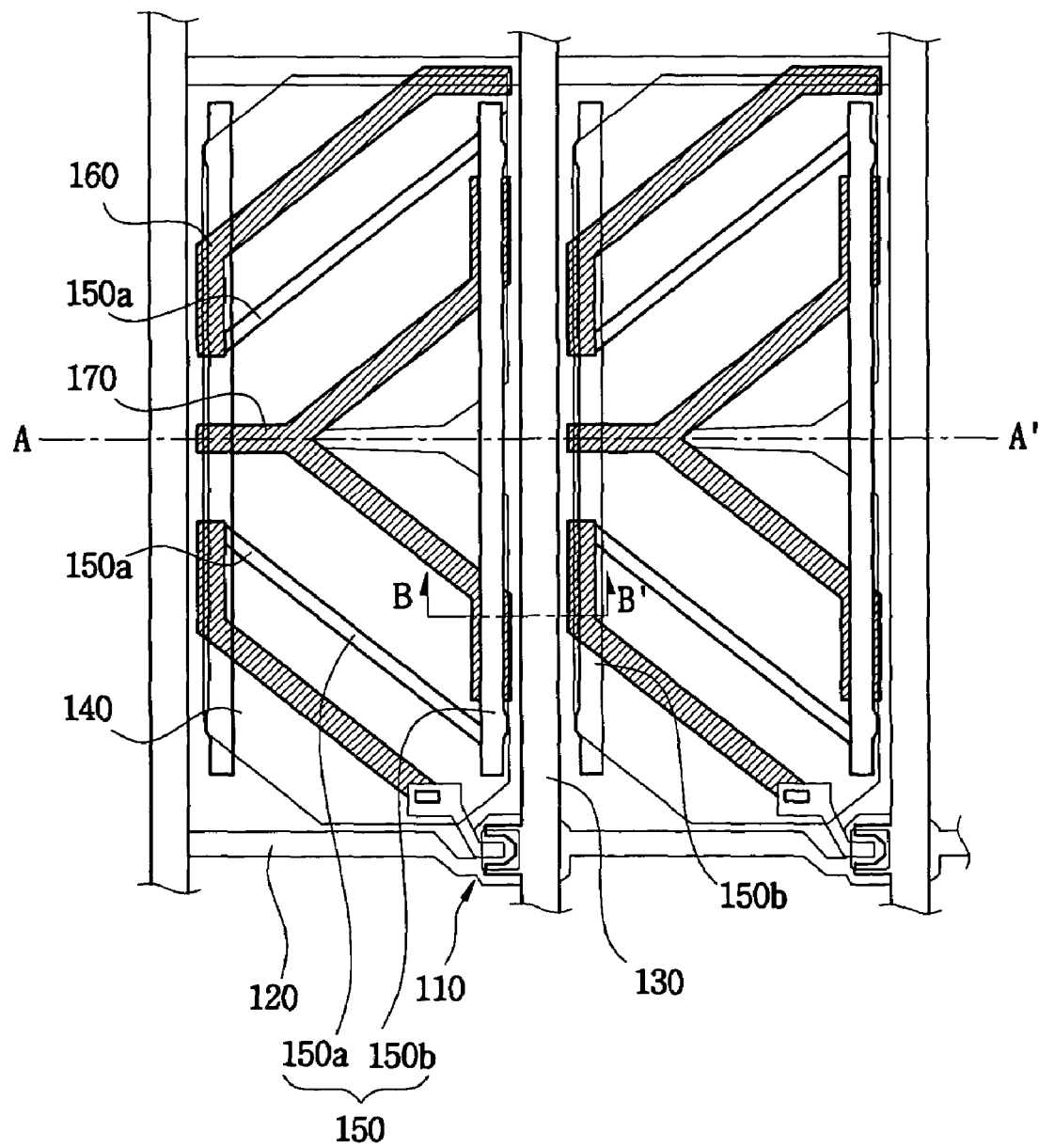
FIG. 1 is a schematic plane view showing a conventional PVA mode LCD apparatus.
Figure 2:
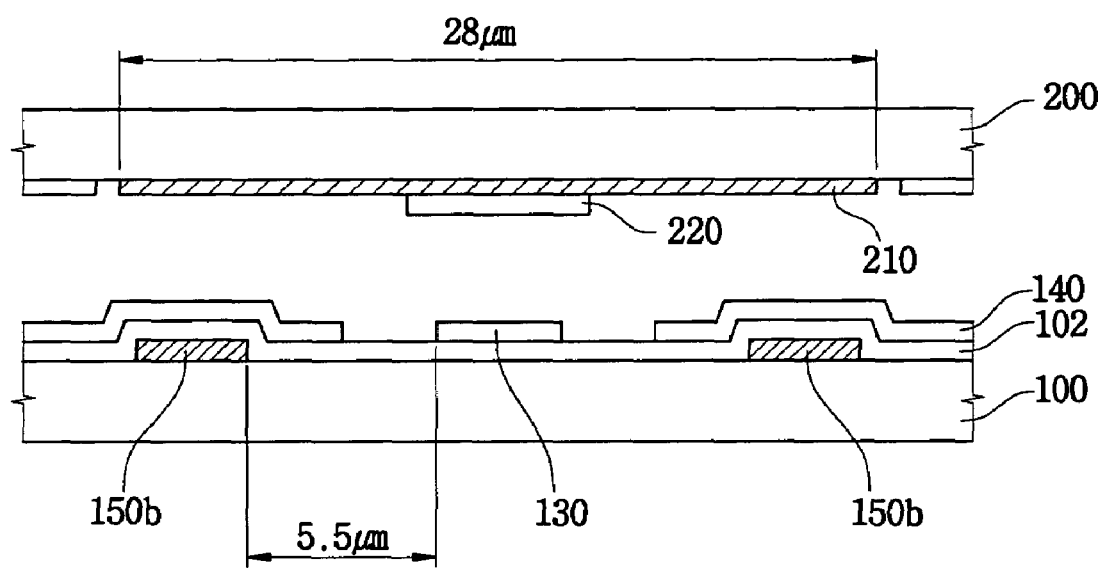
FIG. 2 is a cross-sectional view taken along the line B-B' for showing the conventional PVA mode LCD apparatus shown in FIG. 1.
Figure 3A:
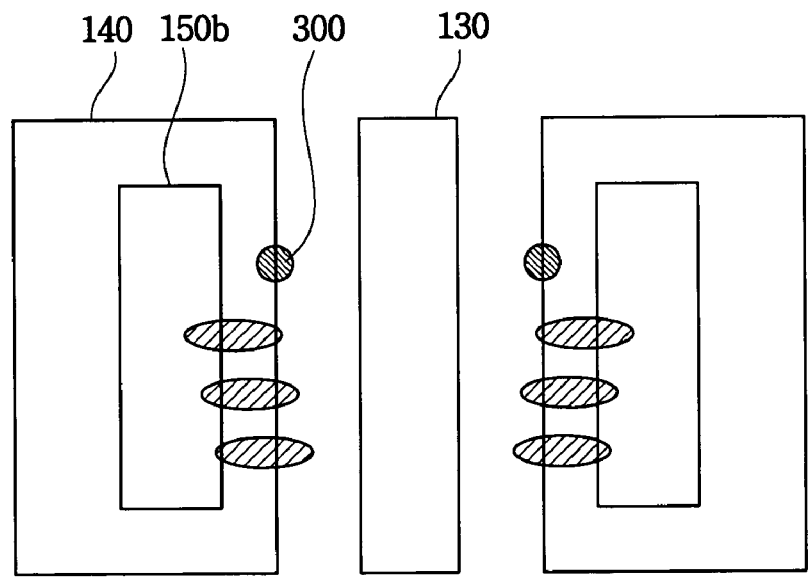
FIG. 3A is a schematic plane view showing a tilting direction of liquid crystal at an area adjacent to a data line of the conventional LCD apparatus shown in FIG. 1.
Figure 3B:
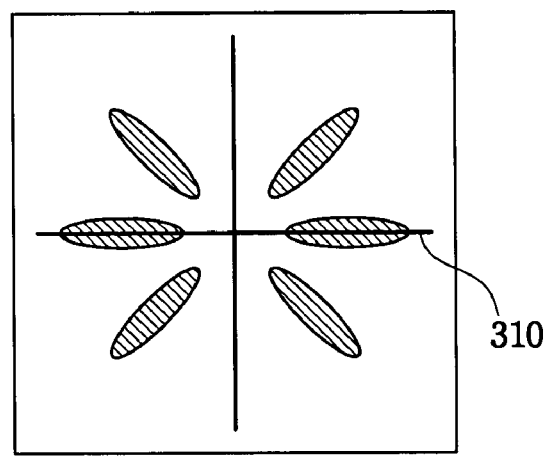
FIG. 3B is a schematic plane view showing a polarizing axis and a tilting direction of liquid crystal at an area adjacent to a data line of the conventional LCD apparatus shown in FIG. 1.

That is, in FIGS. 2, 5 and 9, when the pixel electrodes 140, 440 and 860 are moved towards to the data lines 130, 420 and 850 little by little, for example, such as −2, −1, 0, 1 and 2 micrometers after the data lines 130, 420 and 850 are fixed to the first substrates 100, 400 and 800, respectively, the data lines 130, 420 and 850 are overlapped with the pixel electrodes 140, 440 and 860, respectively, to thereby generate the coupling capacitor.

Figure 11:
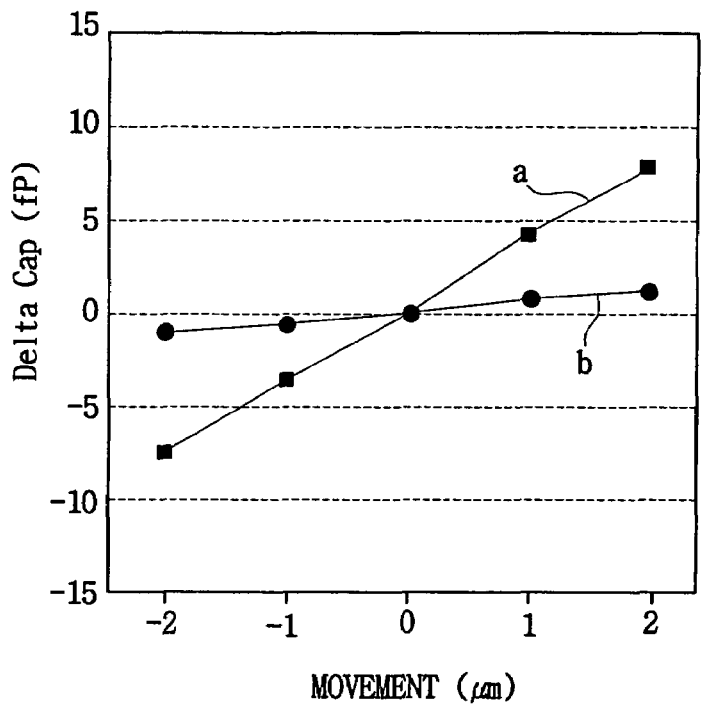
FIG. 11 is a graph showing a variation value of a coupling capacitor of an LCD apparatus and a conventional LCD apparatus.

FIG. 11 is a graph showing a variation value of a coupling capacitor of an LCD apparatus and a conventional LCD apparatus.

Referring to FIG. 11, a first graph (a) represents a variation value of a coupling capacitor in a conventional LCD apparatus and a second graph (b) represents a variation of a coupling capacitor in an LCD apparatus according to the exemplary embodiment of the present invention. In this exemplary embodiment, a variation value of a coupling capacitor according to an LCD apparatus having a TN (Twisted Nematic) mode is equal to that of the second graph (b).

In FIG. 11, the variation value of the coupling capacitor of the LCD apparatus according to the exemplary embodiment of the present invention as represented by the second graph (b) is remarkably smaller than that of the conventional LCD apparatus as represented by the first graph (a). Thus it may well contribute to the reduction of the display defect appeared on the screen.

A PVA mode LCD apparatus according to the exemplary embodiment of the present invention has a steepness of a curve representing a V-T (Voltage-Transmittance), which is greater than that of the conventional TN mode LCD apparatus. That is, since the PVA mode LCD apparatus has a voltage interval between gray scales, which is smaller than that of the TN mode LCD apparatus, the display defect may appear vertically thereon.

Figure 12:
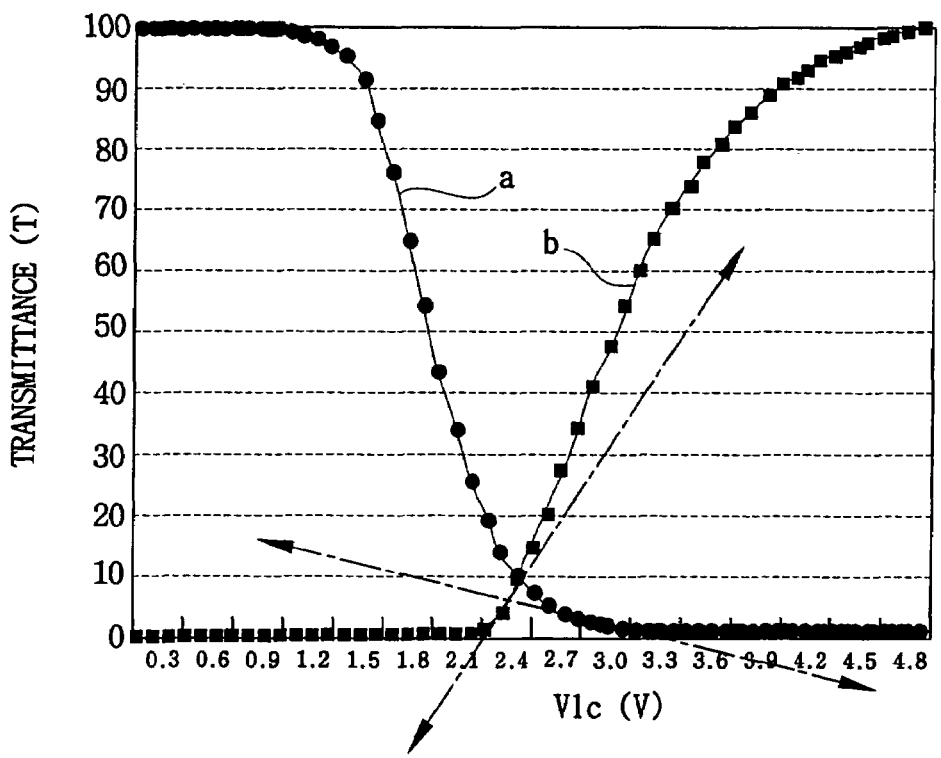
FIG. 12 is a graph showing a relation between a voltage and a transmittance.

FIG. 12 is a graph showing a relation between a voltage and a transmittance. In FIG. 12, a first graph (a) represents the relation between the voltage and transmittance of the TN mode LCD apparatus and a second graph (b) represents the relation between the voltage and transmittance of the PVA mode LCD apparatus.

As shown in FIG. 12, the PVA mode LCD apparatus has a slope of the V-T greater than about three times a slope of the V-T of the TN mode LCD apparatus.

Thus, when the variation value of the coupling capacitor of the PVA mode LCD apparatus is no more than about three times the variation value of the coupling capacitor of the TN mode LCD apparatus and the PVA mode and TN mode LCD apparatuses have a same pixel structure each other, a probability ratio of the display defect that vertically appears on the display screen of the PVA mode LCD apparatus is substantially equal to that of the TN mode LCD apparatus.

Also, the LCD apparatus according to those exemplary embodiments of the present invention may reduce the width of the light-shielding layer. Furthermore, it removes the metal pattern for the storage capacitor and increases a portion of the liquid crystal aligned in the angle of about 45 degrees with respect to the polarizing axis of the polarizing film, so that the LCD apparatus may have a high transmittance compared with that of the conventional LCD apparatus.

As shown in FIGS. 5 and 9, the LCD apparatus according to those exemplary embodiments of the present invention includes the first electrodes 450 and 810 and second electrodes 460 and 820 spaced apart from the data lines 420 and 850 in the interval of about 2 micrometers. Also, the areas from about 2 to about 3 micrometers adjacent to the ends of the first electrodes 450 and 810 and second electrodes 460 and 820 do not need to be covered by means of the light-shielding layers 520 and 920. Thus, the light-shielding layers 520 and 920 have the width of about 21 micrometers.

Also, the LCD apparatus according to those exemplary embodiments of the present invention includes the first and second electrodes 810 and 920 partially overlapped with the pixel electrode 860 and the storage capacitor formed on the overlapped area, thereby removing the separate metal pattern for the storage capacitor.

According to the conventional LCD apparatus, the second protruding portion 150b is spaced apart from the data line 130 in the interval of about 5.5 micrometers, and the light-shielding layer 210 has the width wider than that of the second protruding portion 150b as shown in FIG. 2 so as to the texture or two step-motion. That is, the light-shielding layer 210 of the conventional LCD apparatus has the width of about 28 micrometers.

Figure 13:
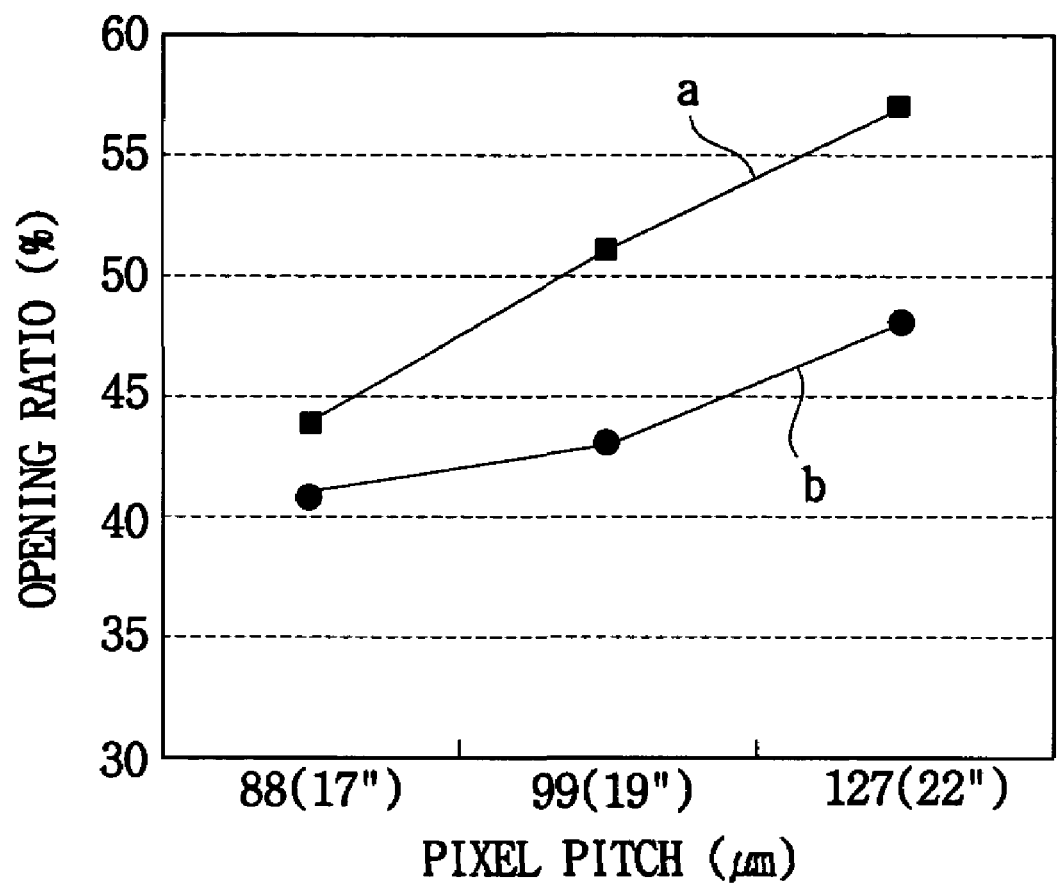
FIG. 13 is a graph showing an opening ratio of an LCD apparatus according to another exemplary embodiment of the present invention and a conventional LCD apparatus.

FIG. 13 is a graph showing an opening ratio of an LCD apparatus according to another exemplary embodiment of the present invention and a conventional LCD apparatus.

Referring to FIG. 13, the LCD apparatus according to another exemplary embodiment of the present invention has an opening ratio (a) higher than an opening ratio (b) of the conventional LCD apparatus.

In this exemplary embodiment, when the LCD apparatus has a display size of about 19 inches, the LCD apparatus has an increase the portion of the opening ratio greater than when the LCD apparatus has a display size of about 17 inches. This is because of a pixel pitch influencing upon the interval between the electrodes.

For example, in case that the pixel pitch is greater than 120 micrometers, the interval between the electrodes is more than 26 micrometers even though one pixel area is divided into two opening portions by means of the common electrode. As a result, a response speed of driving signals for driving the pixel electrodes may be delayed and an operational efficiency of the LCD apparatus may be lowered. Thus, in an area of which the pixel pitch is more than 120 micrometers, the liquid crystal may not be aligned in the angle of about 45 degrees with respect to the polarizing axis, and thus one pixel area may be divided into four opening portions.

In this exemplary embodiment, the interval between the electrodes means the interval T3 between the first and third electrodes 810 and 830 or the interval T4 between the second and third electrodes 820 and 830. Also, the interval T3 between the first and third electrodes 810 and 830 and the interval T4 between the second and third electrodes 820 and 830 are about 17.3 micrometers in case that the pixel pitch is about 17 inches. The interval T3 between the first and third electrodes 810 and 830 and the interval T4 between the second and third electrodes 820 and 830 are about 21 micrometers in case that the pixel pitch is about 19 inches. The interval T3 between the first and third electrodes 810 and 830 and the interval T4 between the second and third electrodes 820 and 830 are about 29 micrometers in case that the pixel pitch is about 22 inches.

In the PVA mode LCD apparatus, generally, the texture displayed in dark color may appears on edges of sub-pixel divided by the electrodes formed in the pixel area, thereby deteriorating the transmittance of the edges of the sub-pixel.

Figure 14A:
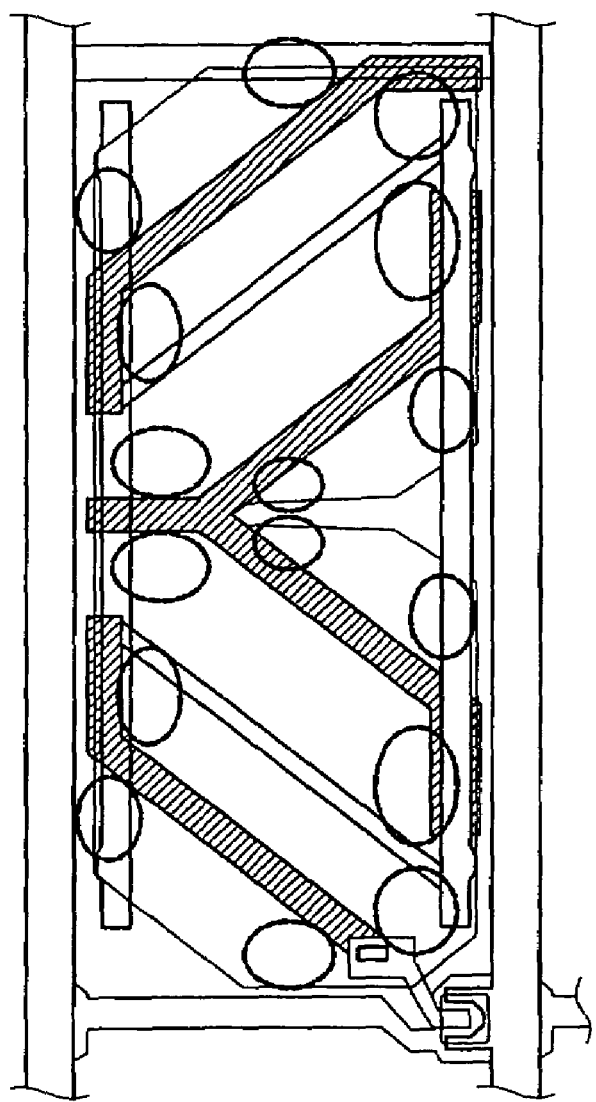
FIG. 14A is a plane view showing areas on which a texture appears of a convention LCD apparatus.
Figure 14B:
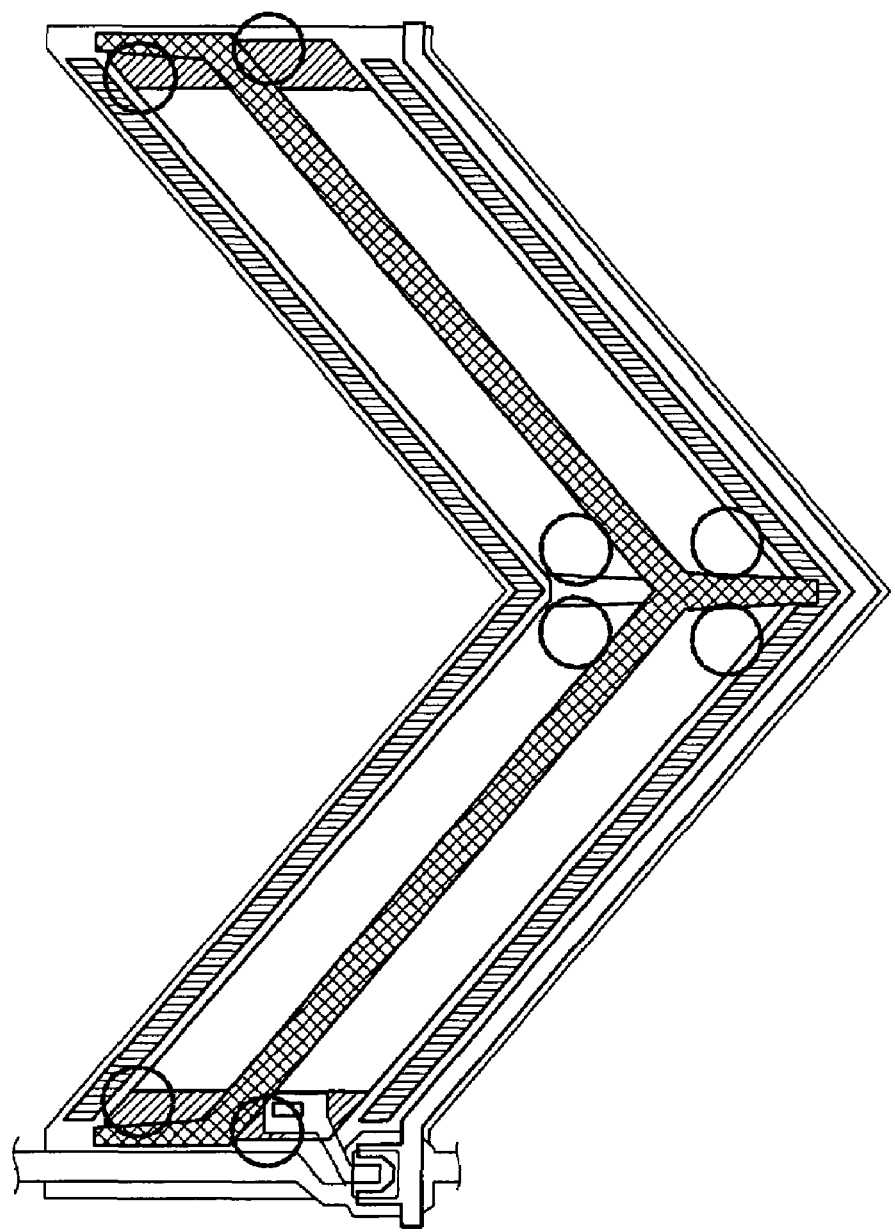
FIG. 14B is a plane view showing areas on which a texture appears of an LCD apparatus according to an exemplary embodiment of the present invention.
Figure 15:
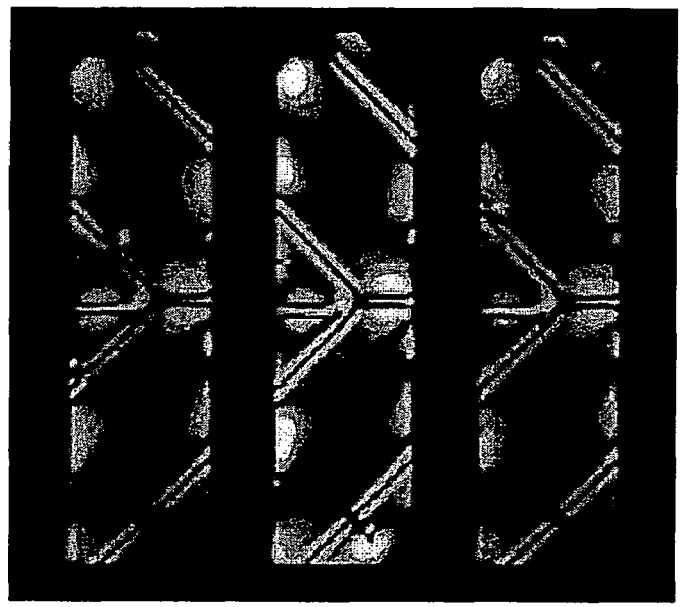
FIG. 15 is a plan view showing a texture area of the conventional LCD apparatus shown in FIG. 14A.
Figure 16:
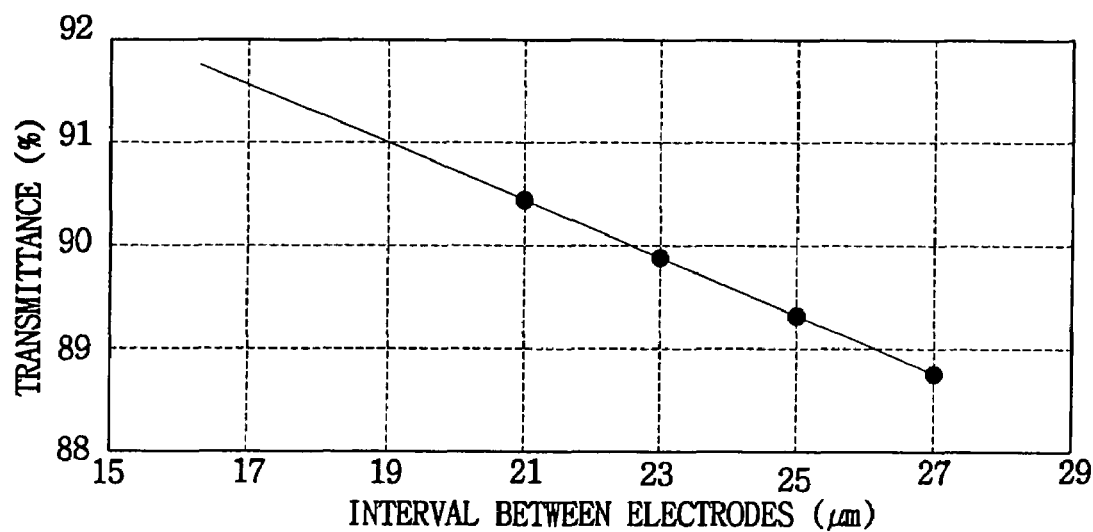
FIG. 16 is a graph showing a relation between an interval of electrode and a transmittance.

FIG. 14A is a plane view showing areas on which a texture appears of a convention LCD apparatus. FIG. 14B is a plane view showing areas on which a texture appears of an LCD apparatus according to an exemplary embodiment of the present invention. FIG. 15 is a plan view showing a texture area of the conventional LCD apparatus shown in FIG. 14A. FIG. 16 is a graph showing a relation between an interval of electrode and a transmittance.

As shown in FIGS. 14A and 14B, an area on which the texture appears of the LCD apparatus according to the exemplary embodiment of the present invention is about 1103 micrometers and an area on which the texture appears of the conventional LCD apparatus is about 2691 micrometers. That is, the area on which the texture appears of the LCD apparatus is less than a half of the area on which the texture appears of the conventional LCD apparatus, thereby increasing a rate of liquid crystal aligned in the angle of about 45 degrees with respect to the polarizing axis of the polarizing film.

When the polarizing axis of the conventional LCD apparatus is rotated in the angle of about 45 degrees, the area on which the texture appears is displayed in a white color as shown in FIG. 15.

As shown in FIG. 16, the transmittance of the PVA mode LCD apparatus is enhanced while the interval between the electrodes is reduced. That is, the PVA mode LCD apparatus according to the exemplary embodiment of the present invention may have the enhanced transmittance compared with the convention LCD apparatus because the PVA mode LCD apparatus may reduce the interval between the electrodes.

As described above, the LCD apparatus according to those exemplary embodiments may reduce the width of the light-shielding layer and it may remove the metal pattern for the storage capacitor and increase the portion of the liquid crystal aligned in the angle of about 45 degrees with respect to the polarizing axis of the polarizing film, so that the LCD apparatus may have a high transmittance compared with that of the conventional LCD apparatus.

Also, the LCD apparatus according to those exemplary embodiments may have the enhanced response speed compared with the conventional LCD apparatus. That is, the LCD apparatus according to those exemplary embodiments may reduce a rising time needed to raise a gate-on signal applied to the gate electrode 432 of the TFT 430 until the gate-on signal reaches a predetermined voltage level, to thereby enhance the response speed.

In order to enhance the response speed of the PVA mode LCD apparatus, the area on which the two step-motion appears and interval between the electrodes have to be reduced.

The area on which the two step-motion appears is equal to the area on which the texture appears as shown in FIGS. 14A and 14B. Thus, the area on which the two step-motion appears of the LCD apparatus according to those exemplary embodiments of the present invention is less than a half of the area on which the two-step motion appears of the conventional LCD apparatus.

Furthermore, the LCD apparatus according to those exemplary embodiments of the present invention may reduce the interval between the electrodes compared with the conventional LCD apparatus.

Figure 17:
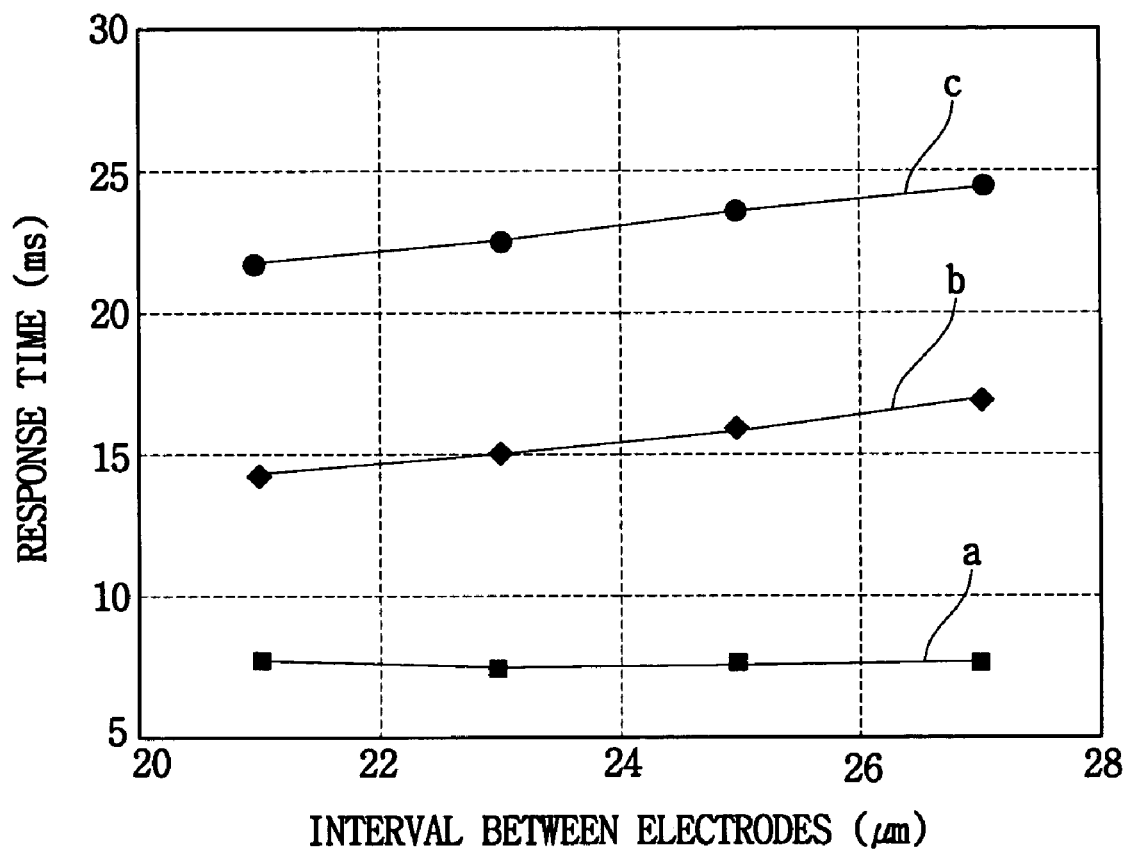
FIG. 17 is a graph showing a relation between an interval of electrodes and a response time.

FIG. 17 is a graph showing a relation between an interval of electrodes and a response time.

In FIG. 17, a first graph (a), a second graph (b) and a third graph (c) represent a falling time of the gate-on signal, a rising time of the gate-signal and a sum of the falling and rising times of the gate-on signal, respectively.

As shown in FIG. 17, when the interval between the electrodes is reduced, the response time that is, the rising time is also reduced.

As aforementioned above, the data line of the LCD apparatus according to those exemplary embodiments of the present invention has the V-shape and the electrodes are inclined in the angle of about 45 degrees with respect to the polarizing axis of the polarizing film. Also, the pixel electrode formed in the pixel area is spaced apart from the electrodes or partially overlapped with the electrodes.

Accordingly, the variation value of the coupling capacitor due to the data line and pixel electrode may be reduced, thereby preventing the display defect that vertically appears on the display screen.

In the LCD apparatus according to those exemplary embodiments of the present invention, the intervals between the data line and electrodes disposed adjacent to both sides of the data line is reduced. Also, when the electric field is applied to the liquid crystal, the liquid crystal positioned at the area from about 2 to about 3 micrometers adjacent to the ends of the pixel electrode is tilted in the angle of about 45 degrees with respect to the polarizing axis of the polarizing film. Therefore, the light-shielding layer does not need to cover the electrodes disposed adjacent to both sides of the data line, so that the width of the light-shielding layer may be reduced and the transmittance of the LCD apparatus may be enhanced.

In addition, since the electrodes and pixel electrode are overlapped with each other, the LCD apparatus according to those exemplary embodiments of the present invention may remove the metal pattern for the storage capacitor, to thereby enhance the transmittance.

Furthermore, the LCD apparatus according to those exemplary embodiments of the present invention may reduce the area on which the texture appears at the ends of the pixel electrode because the electrodes are inclined in the angle of about 45 degrees with respect to the polarizing axis of the polarizing film, thereby enhancing the transmittance.

Also, in the LCD apparatus according to those exemplary embodiments of the present invention, the area on which the two step-motion appears and intervals between the electrodes are reduced, so that the rising time is reduced and the response time increases.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display (LCD) apparatus comprising:
   a first substrate having a common electrode;
   a second substrate facing the first substrate;
   a plurality of gate lines formed on the second substrate and comprising a first gate line and a second gate line neighboring the first gate line;
   a plurality of data lines formed on the second substrate, intersecting the gate lines and comprising a first data line and second data line neighboring the first data line;
   a pixel area defined by the first gate line, the second gate line, the first data line and the second data line;
   a first conductive pattern having a V-shape and formed on the second substrate in the pixel area adjacent to the first data line;
   a second conductive pattern having a V-shape and formed on the second substrate in the pixel area adjacent to the second data line;
   a V-shaped pixel electrode formed in a pixel area; and
   a liquid crystal layer interposed between the first and the second substrate.

2. The LCD apparatus of claim 1, wherein the liquid crystal layer comprises a negative type dielectric constant anisotropy.

3. The LCD apparatus of claim 1, wherein the first substrate comprises a first polarizing film and the second substrate comprises a second polarizing film and wherein the first and second conductive patterns are inclined at an angle of about 45 degrees with respect to a polarizing axis of the first and second polarizing films.

4. The LCD apparatus of claim 1, wherein the first substrate comprises: a light-shielding layer formed on the first substrate and having a width equal to a sum of a width in the second direction of the first conductive pattern, a width in the second direction of the second conductive pattern and first interval between the first and second conductive patterns to cover the first and second conductive patterns, wherein the common electrode includes an opening having a first opening portion extended from a bending portion of the first conductive pattern in a first direction with a predetermined length, a second opening portion extended from an end of the first opening portion in a second direction and a third direction substantially opposite to the second direction and inclined in a predetermined slope with respect to the first opening portion, and a third opening portion extended from an end of the second opening portion to the second conductive pattern with a predetermined length, the opening having a Y-shape and formed by partially removing the common electrode.

5. The LCD apparatus of claim 4, wherein a second interval between the first data line and the first conductive pattern and a third interval between the second data line and the second conductive pattern are about 2 micrometers.

6. The LCD apparatus of claim 1, wherein the V-shaped pixel electrode is spaced apart from the first and second conductive patterns.

7. The LCD apparatus of claim 6, wherein a gap between the V-shaped pixel electrode and the first and second conductive patterns ranges about 2 to about 3 micrometers.

8. The LCD apparatus of claim 1, wherein the V-shaped pixel electrode is partially overlapped with the first and second conductive patterns.

9. The LCD apparatus of claim 8, wherein the overlapped width between the V-shaped pixel electrode and the first and second conductive patterns is from about 2 to about 3 micrometers.

10. The LCD apparatus of claim 1, wherein the second substrate further comprises a metal pattern for a storage capacitor.

11. The LCD apparatus of claim 10, wherein the metal pattern is formed adjacent to ends of the first and second conductive patterns or disposed on a bending portion of the pixel area having the V-shape with a predetermined width.

12. A liquid crystal display LCD) apparatus comprising:
a first substrate;
a common electrode formed on the first substrate;
a second substrate facing the first substrate;
a plurality of gate lines formed on the second substrate and comprising a first gate line and a second gate line neighboring the first gate line;
a plurality of data lines formed on the second substrate intersecting the gate lines and comprising a first data line and a second data line neighboring the first data line;
a pixel area having a V-shape defined by the first gate line, the second gate line, the first data line and the second data line;
a first conductive pattern having a V-shape and formed on the second substrate in the pixel area adjacent to the first data line;
a second conductive pattern having the V-shape and formed on the second substrate in the pixel areas adjacent to the second data line; and
a liquid crystal layer interposed between the first substrate and second substrate.

13. The LCD apparatus of claim 12, wherein the liquid crystal layer has a negative type dielectric constant anisotropy.

14. The LCD apparatus of claim 12, further comprising
a light-shielding layer formed on the first substrate and having a width substantially equal to a sum of a width of the first conductive pattern, a width of the second conductive pattern and an interval between the first and second conductive patterns so as to cover the first and second conductive patterns;
wherein the common electrode is formed on the light-shielding layer and has a Y shaped opening comprising:
a first opening extended from a portion of the common electrode corresponding to a bending portion of the first electrode;
a second opening extended from an end of the first opening portion; and
a third opening extended from an end of the second opening portion towards the second conductive pattern.

15. The LCD apparatus of claim 12, further comprising a storage capacitance electrode extended from a bending portion of the first conductive pattern to a bending portion of the second conductive pattern.

16. The LCD apparatus of claim 12, wherein a gap between the pixel electrode and the first and second conductive patterns ranges from about 2 to about 3 micrometers.

17. The LCD of claim 12, further comprising a first polarizing film formed on the first substrate and a second polarizing film formed on the second substrate.

18. The LCD of claim 17, wherein the first and second conductive patterns are inclined at an angle of about 45 degrees with respect to a polarizing axis of the first and second polarizing films.

19. An LCD apparatus comprising:
a first substrate having a common electrode;
a second substrate including a plurality of gate lines extended in a first direction and arranged in a second direction substantially perpendicular to the first direction;
a plurality of data lines intersected with the gate lines; a plurality of pixel areas having a V-shape defined by the gate and data lines;
a first conductive pattern having the V-shape formed in the pixel areas adjacent to a data line corresponding to a present pixel area among the pixel areas, on which the first conductive pattern is formed, to partially cover the pixel areas;
a second conductive pattern having the V-shape formed in the pixel areas and adjacent to a data line corresponding to a previous pixel area among the pixel areas to partially cover the pixel area;
a pixel electrode having the V-shape and partially overlapped with the first and second conductive patterns;
a liquid crystal layer interposed between the first and second substrates;
a light emitting unit disposed under the second substrate for supplying a light to the first and second substrates; and
a polarizing film having a polarizing axis for selectively transmitting the light which is disposed on an upper surface of the first substrate and a lower surface of the second substrate, respectively.

20. The LCD apparatus of claim 19, wherein the liquid crystal layer comprises a negative type dielectric constant anisotropy, and the first and second conductive patterns are inclined at an angle of about 45 degrees with respect to the polarizing axis.

21. The LCD apparatus of claim 19, wherein the first substrate comprises:

a light-shielding layer formed on the first substrate and having a width equal to a sum of a width in the second direction of the first conductive pattern, a width in the second direction of the second conductive pattern and an interval between the first and second conductive patterns so as to cover the first and second conductive patterns;

wherein the common electrode is formed on the light-shielding layer and includes an opening having a first opening portion extended from a bending portion of the first conductive pattern in the first direction with a predetermined length, a second opening portion extended from an end of the first opening portion in a second direction and a third direction substantially opposite to the second direction and inclined in a predetermined slope with respect to the data line, and a third opening portion extended from an end of the second opening portion to the second conductive pattern with a predetermined length, the opening having a Y-shape and formed by partially removing the common electrode.

22. The LCD apparatus of claim 19, wherein the overlapped width between the pixel electrode and the first and second conductive patterns is from about 2 to about 3 micrometers.

* * * * *